US010365081B2

(12) United States Patent
Xia et al.

(10) Patent No.: US 10,365,081 B2
(45) Date of Patent: Jul. 30, 2019

(54) CHECKING TOOL FOR MEASURING DISTANCE BETWEEN ADJACENT SINKING GROOVES IN INNER HOLE OF MECHANICAL PART

(71) Applicants: PACIFIC PRECISION FORGING CO., LTD., Taizhou, Jiangsu (CN); PACIFIC PRECISION POWERTRAIN CO., LTD., Taizhou, Jiangsu (CN)

(72) Inventors: Hanguan Xia, Taizhou (CN); Jun Qin, Taizhou (CN); Hongjun Zhao, Taizhou (CN); Yi Dong, Taizhou (CN); Yong Zhang, Taizhou (CN)

(73) Assignees: PACIFIC PRECISION FORGING CO., LTD., Taizhou (CN); PACIFIC PRECISION POWERTRAIN CO., LTD., Taizhou (CN)

( * ) Notice: Subject to any disclaimer, the term of this patent is extended or adjusted under 35 U.S.C. 154(b) by 0 days.

(21) Appl. No.: 15/736,734

(22) PCT Filed: Sep. 25, 2016

(86) PCT No.: PCT/CN2016/100020
§ 371 (c)(1),
(2) Date: Dec. 14, 2017

(87) PCT Pub. No.: WO2017/050288
PCT Pub. Date: Mar. 30, 2017

(65) Prior Publication Data
US 2018/0188014 A1 Jul. 5, 2018

(30) Foreign Application Priority Data
Sep. 25, 2015 (CN) .......................... 2015 1 0619352

(51) Int. Cl.
G01B 5/18 (2006.01)
G01B 5/14 (2006.01)
G01B 3/22 (2006.01)

(52) U.S. Cl.
CPC ................. *G01B 5/14* (2013.01); *G01B 3/22* (2013.01); *G01B 5/18* (2013.01)

(58) Field of Classification Search
CPC combination set(s) only.
See application file for complete search history.

(56) References Cited

FOREIGN PATENT DOCUMENTS

CN 2835944 Y 11/2006
CN 102878888 A * 1/2013 ............... G01B 5/00
(Continued)

OTHER PUBLICATIONS

Jan. 5, 2017 International Search Report issued in International Patent Application No. PCT/CN2016/100020.

*Primary Examiner* — Brandi N Hopkins
(74) *Attorney, Agent, or Firm* — Oliff PLC

(57) ABSTRACT

A checking tool for measuring a distance between adjacent sinking grooves in an inner hole of a mechanical part, including: a gage block, end cover, sliding piece, pin, base, pin seat, support, measuring rod, spring, barrel, and dial indicator. An inner end face of the base is provided with the sliding piece, at least three concentric circular arc grooves are on the end face, paired eccentric arc grooves are on the sliding piece, the pin connected to the pin seat runs through the base and sliding piece, which is axially limited by the end cover, and the seat rotates relative to the base to realize radial expansion displacement of the sliding piece. A measuring head is formed by the dial indicator, measuring rod, spring and barrel. By positioning the edges of adjacent sinking grooves in an inner hole, measurement for a distance between the grooves is converted into depth measurement.

5 Claims, 8 Drawing Sheets

(56) References Cited

FOREIGN PATENT DOCUMENTS

| | | | | | |
|---|---|---|---|---|---|
| CN | 202947642 | U | | 5/2013 | |
| CN | 103822565 | A | * | 2/2014 | ............... G01B 5/14 |
| CN | 103822567 | A | | 5/2014 | |
| CN | 103837065 | A | * | 6/2014 | ............... G01B 5/14 |
| CN | 104457488 | A | * | 12/2014 | ............... G01B 5/00 |
| CN | 104807388 | A | | 7/2015 | |
| CN | 204438980 | U | | 7/2015 | |
| CN | 105180877 | A | | 12/2015 | |
| CN | 205066645 | U | | 3/2016 | |
| KR | 100213814 | B1 | | 8/1999 | |

* cited by examiner

CHECKING TOOL FOR MEASURING DISTANCE BETWEEN ADJACENT SINKING GROOVES IN INNER HOLE OF MECHANICAL PART

TECHNICAL FIELD

The present invention relates to a length measuring instrument. Specifically, the present invention relates to a measurement checking tool, and particularly to a checking tool for precisely measuring a distance between adjacent sinking grooves in an inner hole of a mechanical part.

RELATED ART

In reality, most of mechanical parts fit with shafts through inner holes, and particularly, a gear in mechanical transmission equipment such as a machine tool and an automobile is positioned and supported by a shaft. Gear transmission is mainly used to transfer a torque, and the transmission quality thereof directly influences a quality index of corollary equipment. For example, an axle shaft gear of an automobile differential is a bevel gear, the meshing quality thereof mainly depending on the positioning precision between the axle shaft bevel gear and a shaft. The diameter of an inner hole of the axle shaft bevel gear is about only 20 mm, so a distance between two adjacent sinking grooves provided therein cannot be quantitatively measured by using a conventional measuring tool, and cannot be effectively measured by using an existing advanced profile meter or a three-coordinate measuring machine as well. A dedicated caliper gage is commonly used for measurement in the present industry. Although such qualitative detection is convenient and fast and can be used for appraising the machining quality, the qualitative detection cannot quantize the size and direction of a deviation, and does not facilitate production guidance. A differential equipped for a luxurious automobile greatly influences the transmission quality, and the qualitative detection for the axle shaft bevel gear via the caliper gage in the prior art cannot meet matching requirements.

SUMMARY

In view of the defect in the prior art of only qualitative detection, the present invention provides a checking tool for measuring a distance between adjacent sinking grooves in an inner hole of a mechanical part, which has a reasonable structure, a reliable positioning basis and an accurate measuring function and is convenient and fast to operate. The checking tool not only can accurately measure a distance between adjacent sinking grooves in an inner hole of a mechanical part, but also can judge a deviation direction.

Technical objectives of the present invention are fulfilled by means of the following technical solution.

The checking tool for measuring a distance between adjacent sinking grooves in an inner hole of a mechanical part includes a gage block, an end cover, a sliding piece, a pin, a base, a pin seat, a support, a measuring rod, a spring, a barrel, and a dial indicator. The gage block has a T-shaped side face, is disposed on a bottom end face in an inner hole of a workpiece and stops at an edge of an inner sinking groove. On this basis, the length away from an outer sinking groove is measured. The end cover, the base and the pin seat are all flange-shaped, and an outer circle of the end cover is in clearance fit with an inner hole of a measuring port portion of the workpiece. The improvements are as follows.

At least three radial opening grooves are uniformly distributed on an end face, facing the inner hole of the workpiece, of the base, each radial opening groove being provided with a sliding piece. Concentric circular arc grooves paired with the radial opening grooves are also provided on the end face of the base. An outer edge of the sliding piece is a shoulder-type circular arc edge, an outer convex edge can be inserted into the outer sinking groove of the workpiece, and a clockwise eccentric circular arc groove corresponding to the concentric circular arc groove on the end face of the base is provided on a plate surface of the sliding piece. The pin is a cylindrical pin, a cylinder segment of the pin runs down through the concentric circular arc grooves of the base and the eccentric circular arc groove of the sliding piece axially in sequence, the pin is in interference fit with the pin seat, the sliding piece capable of sliding radially is axially limited by the externally-connected end cover, and the pin seat is driven to rotate relative to the base, such that the built-in pin limits the sliding piece to make same do radial displacement along a track of the eccentric circular arc groove. The barrel is a slender pipe, the dial indicator is inserted into an upper pipe orifice, an indicator rod of the dial indicator is axially displaced under the control of the spring and the measuring rod both disposed in the barrel, the bottom end of the barrel is inserted into inner holes of the pin seat and the base, and axially stops at an upper end face of the sliding piece, the measuring rod disposed in the barrel directly pushes against an upper end face of the gage block under the pushing of the spring, and a structure for quantitatively detecting an axial position of the gage block in the inner hole of the workpiece by the dial indicator is formed.

As a further improved solution, the height of the gage block is smaller than a distance between two adjacent sinking grooves in an inner hole of a workpiece to be measured by 1-2 mm.

As a further improved solution, at least three axially-adjustable elastic supports are installed at an outer edge of the base, the supports are in elastic contact with the end face of the workpiece, and the supports are adjusted to make the bottom end face of the sliding piece higher than the bottom end face of the outer sinking groove in the inner hole of the workpiece to be measured by 0.5-1.0 mm under the condition of dead weight.

As a further improved solution, the spring is a pressure spring.

As a further improved solution, the concentric circular arc grooves on the end face of the base and the eccentric circular arc groove on the end face of the sliding piece are of the same shape, only the center of circle of the eccentric circular arc groove is biased clockwise, and the radial displacement of the sliding piece is 2-5 mm.

Compared with the prior art, the present invention has the following positive effects.

1. A detection structure is simple, the operation is convenient and fast, and the detection efficiency is high.

2. A distance between adjacent sinking grooves in an inner hole is measured under positioning conditions, and a detection result is accurate and reliable.

3. Quantitative detection can objectively reflect the size and direction of a machining deviation, thereby facilitating improvement for subsequent machining quality.

DETAILED DESCRIPTION

The present invention will be further illustrated hereinbelow according to the drawings with reference to the embodiments.

Figure 1:
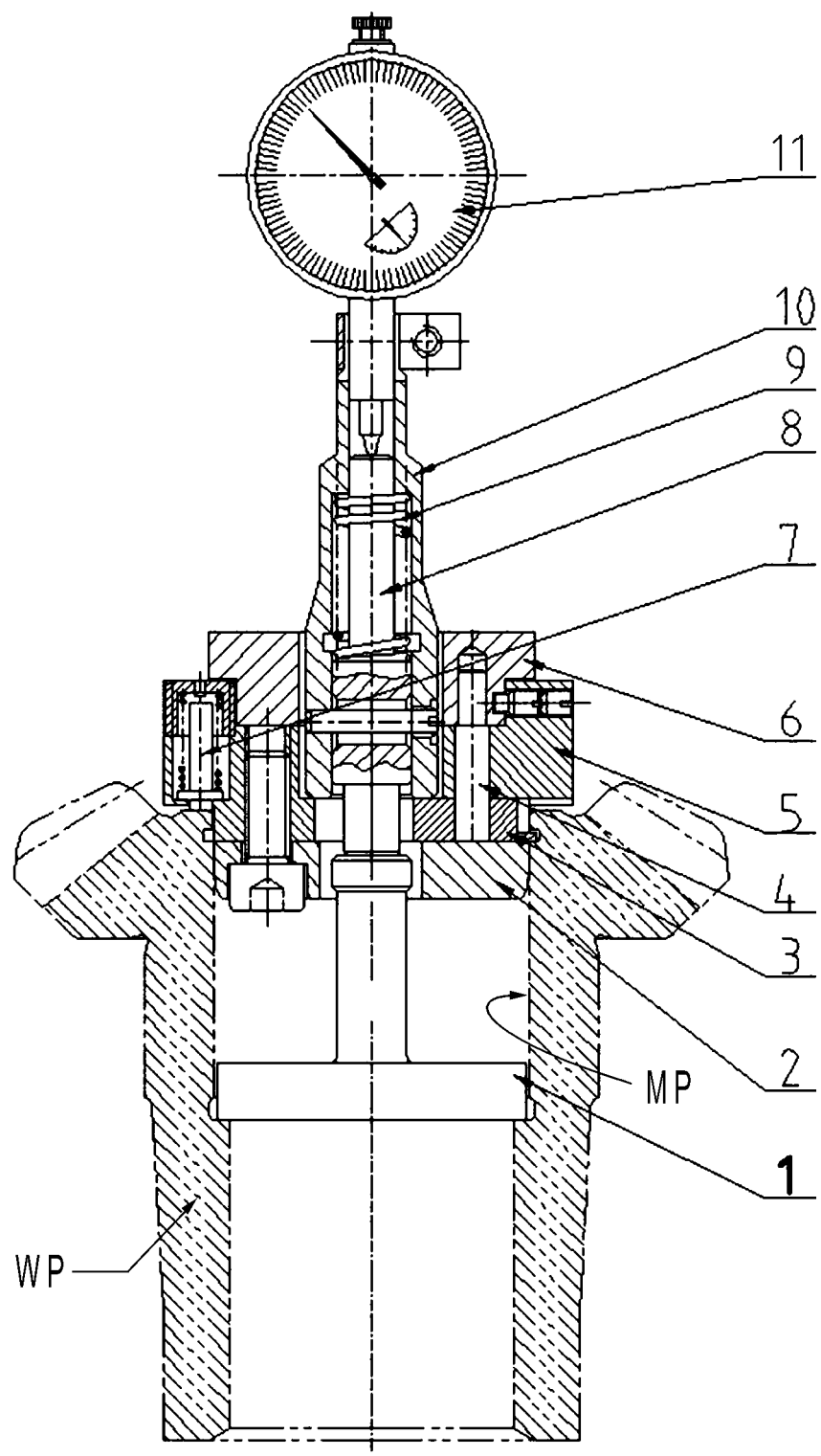
FIG. 1 is a structural section view of the present invention, a workpiece in the figure being an axle shaft bevel gear of an automobile differential.
Figure 2:
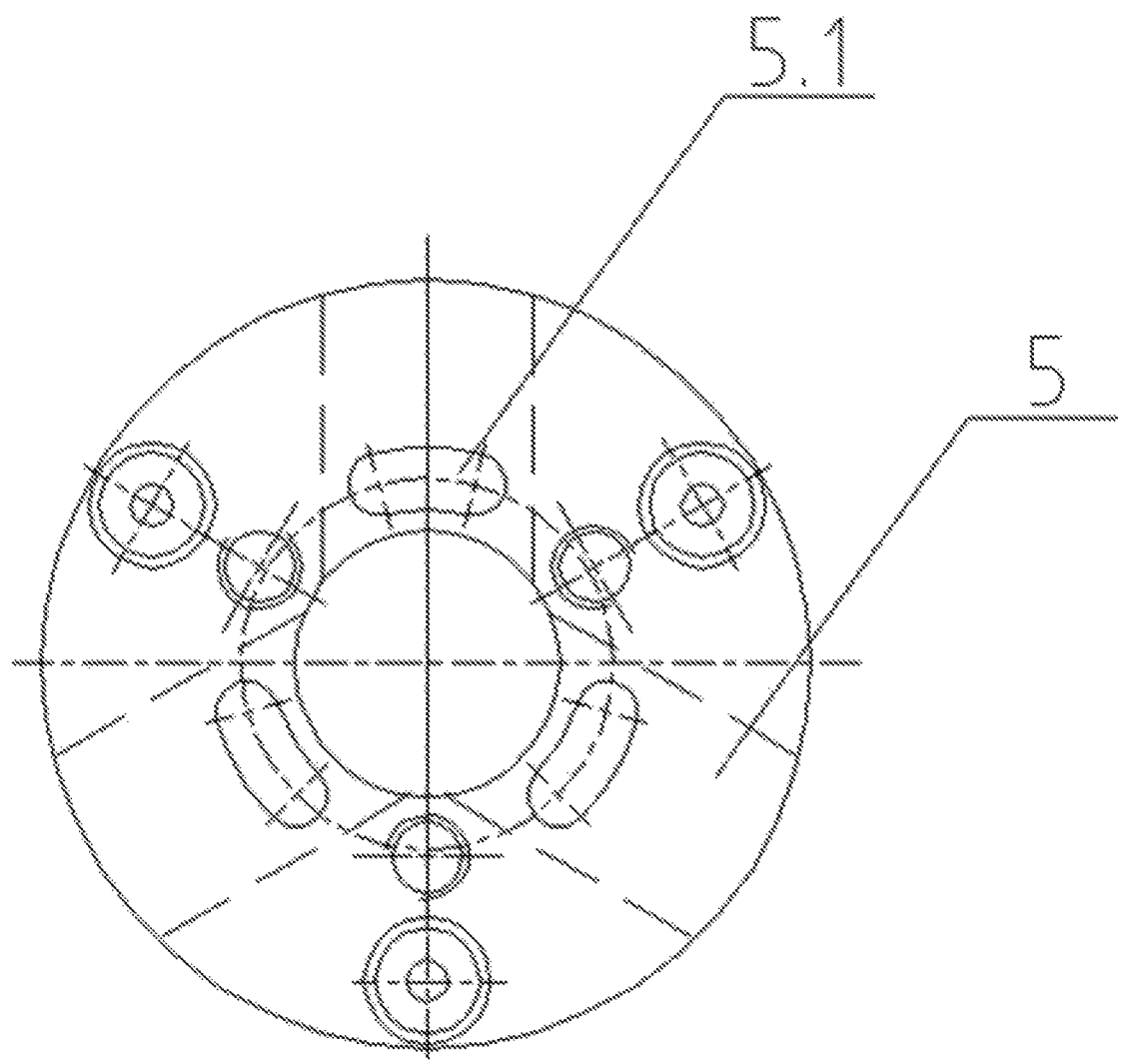
FIG. 2 is a plane diagram of a base in FIG. 1.
Figure 3:
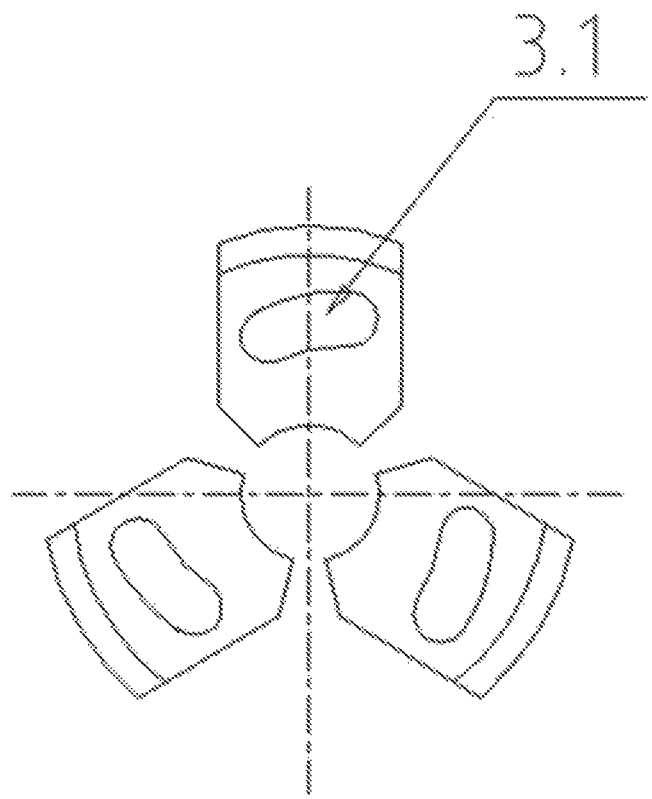
FIG. 3 is an arrangement diagram of three sliding pieces in FIG. 1.
Figure 4:
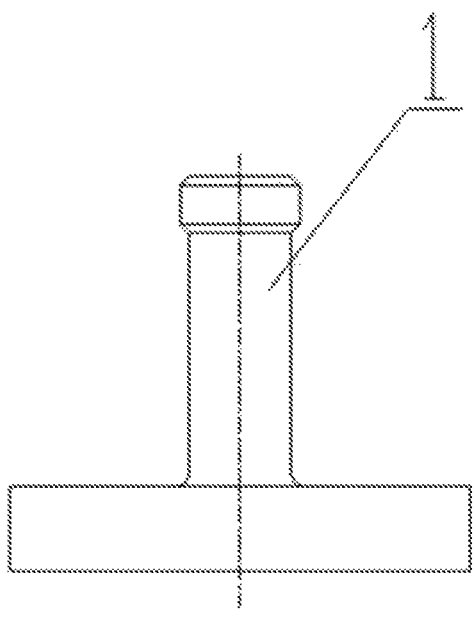
FIG. 4 is a structural diagram of a gage block.
Figure 5:
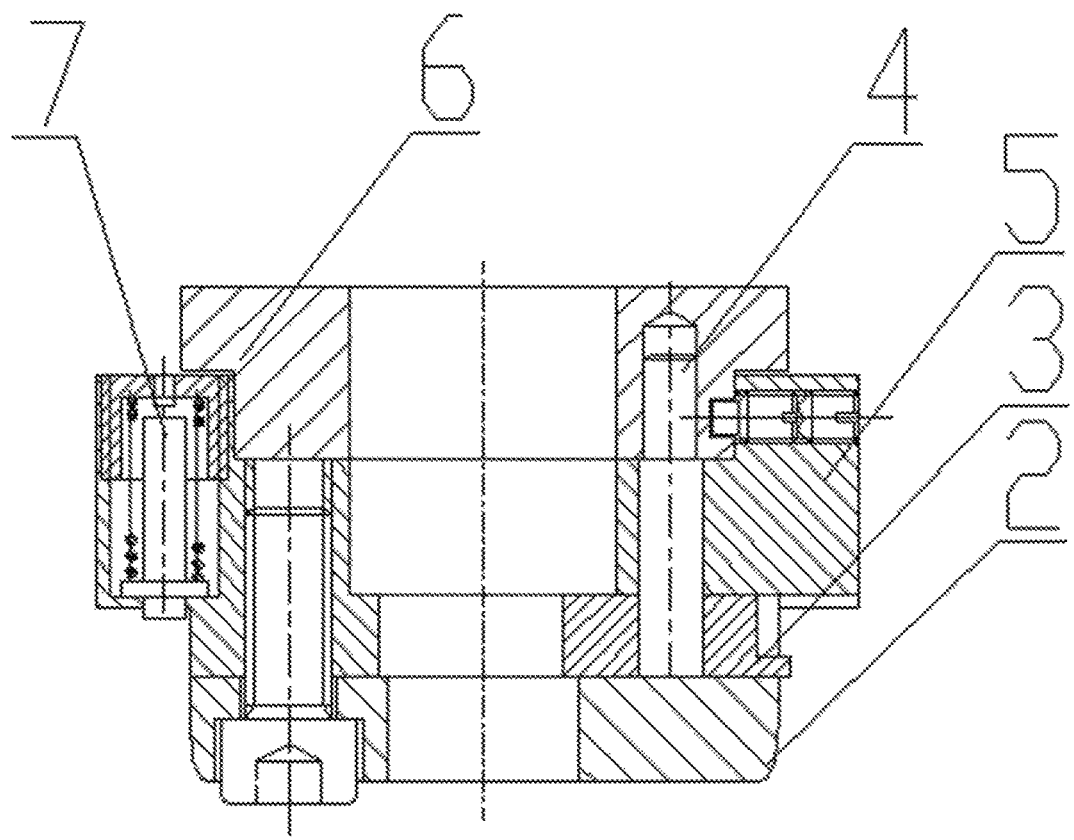
FIG. 5 is a diagram of an assembly of an end cover, a sliding piece, a pin, a base, a pin seat and a support.
Figure 6:
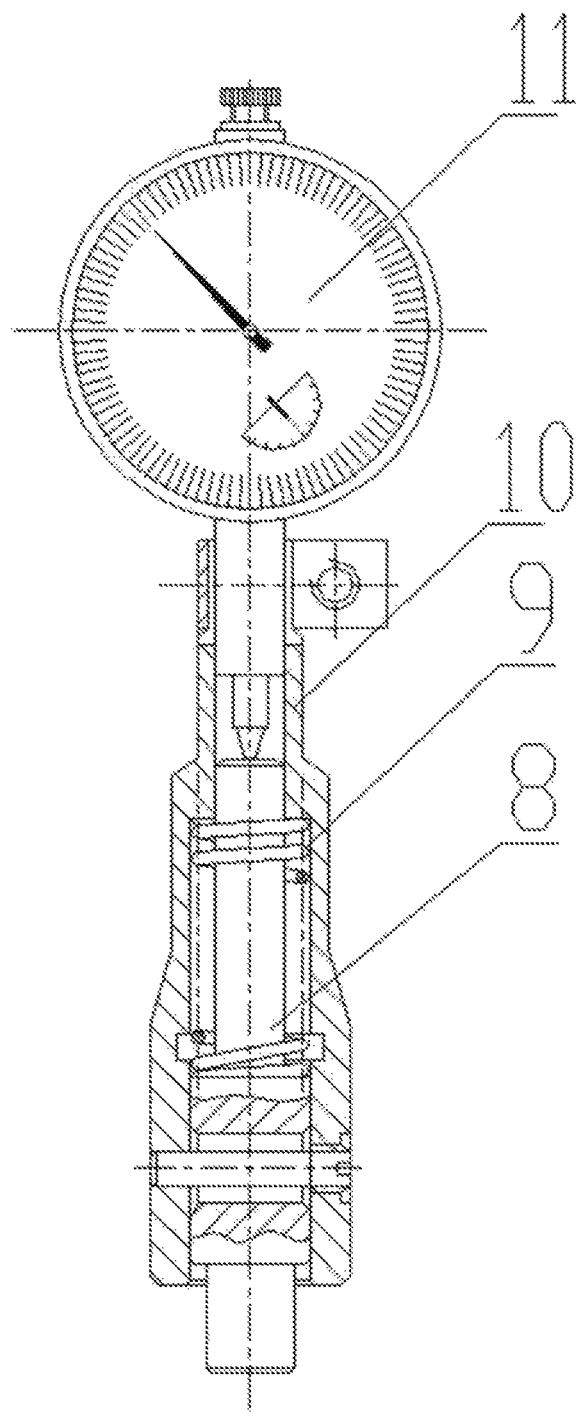
FIG. 6 is a diagram of an assembly of a gage rod, a spring, a barrel and a dial indicator.
Figure 7:
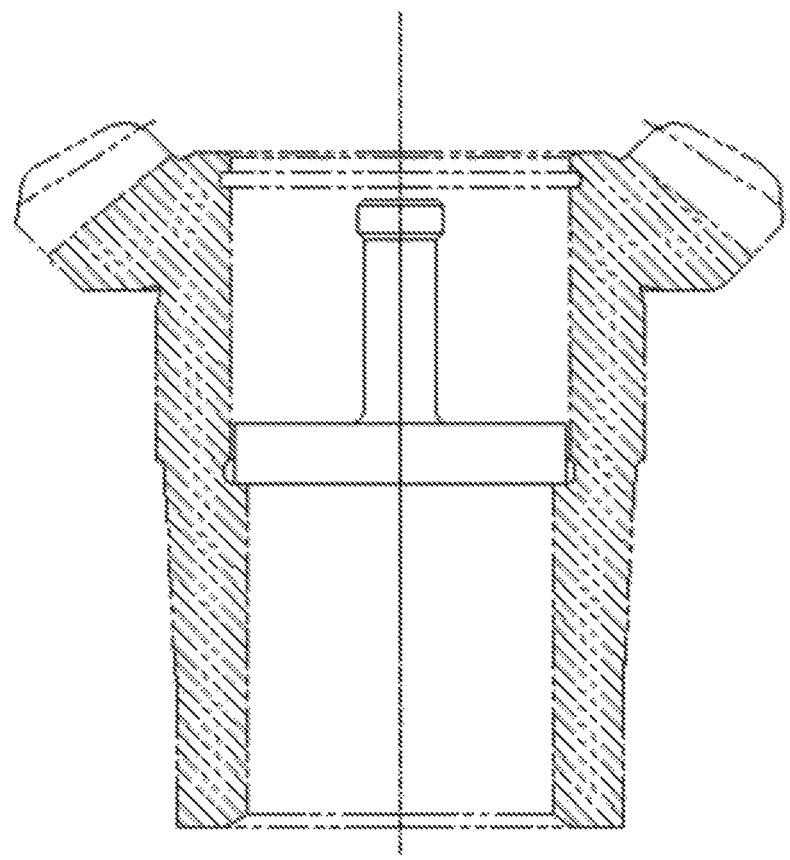
FIG. 7 is a diagram showing first positioning installation of a gage block during detection.

FIG. 1 shows a checking tool for measuring a distance between adjacent sinking grooves in an inner hole of a mechanical part, and is an embodiment for detecting a distance between adjacent sinking grooves in an inner hole of an axle shaft bevel gear of an automobile differential, the axle shaft bevel gear being a mechanical part shown as a workpiece WP in the drawings. The checking tool includes a gage block 1, an end cover 2, a sliding piece 3, a pin 4, a base 5, a pin seat 6, a support 7, a measuring rod 8, a spring 9, a barrel 10 and a dial indicator 11. The gage block 1 is a sizing device manufactured according to a distance between adjacent sinking grooves in an inner hole of the workpiece WP to be measured. A side face of the gage block is T-shaped as shown in FIG. 4, that is, a disk and a straight rod. For convenience of a measurement operation, the height of the gage block 1 is smaller than the distance between the adjacent sinking grooves in the inner hole of the workpiece WP to be measured. The distance between the adjacent sinking grooves of the workpiece WP in the present embodiment is 49.075±0.05 mm, and the height of the 5 gage block 1 for detection is determined as 48±0.002 mm. As shown in FIG. 7, before detection, the gage block 1 is disposed in the inner hole of the workpiece WP, the disk bottom end face of the gage block 1 stops at an edge of an inner sinking groove, and the upward straight rod end face is in contact with the measuring rod 8 for measurement. The measurement is on the basis of the edge of the inner sinking groove, so as to be simple, convenient and fast. The end cover 2, the base 5 and the pin seat 6 that are stacked in sequence are all flange-shaped, and holes reserved in the middles facilitate insertion of the barrel 10. An outer circle of the end cover 2 is in clearance fit with an inner hole of a measuring port portion MP of the workpiece WP, and the base 5 and the pin seat 6 are stacked upon the end cover 2 in sequence. At least three radial opening grooves are uniformly distributed on an end face, facing the inner hole of the workpiece WP, of the base 5, each radial opening groove being provided with a sliding piece 3. Concentric circular arc grooves 5.1 paired with the radial opening grooves are also provided on the end face of the base 5. The pin 4 is a cylindrical pin, a cylinder segment of the pin 4 runs down through the concentric circular arc grooves 5.1 of the base 5 and an eccentric circular arc groove 3.1 of the sliding piece 3 axially in sequence, the pin 4 is in interference fit with the pin seat 6, and the sliding piece 3 capable of sliding radially is axially limited by the externally-connected end cover 2. A measuring seat as shown in FIG. 5 is formed by the aforementioned connection, and the pin seat 6 and the base 5 rotate relatively, such that the built-in pin 4 limits the sliding piece 3 to make the sliding piece 3 undergo radial displacement along a track of the eccentric circular arc groove 3.1. The sliding piece 3 is radially displaced outwards to make an outer convex edge inserted into an outer sinking groove of the workpiece WP, and installation of the measuring seat under positioning conditions facilitates subsequent detection. After the measurement is ended, the pin seat 6 rotates relative to the base 5 in an opposite direction, the sliding piece 3 is returned into the base 5, and because the measuring seat is barrier-free axially, the measuring seat is convenient to disassemble from the upper part of the workpiece WP. In the aforementioned structure, the concentric circular arc grooves 5.1 on the end face of the base 5 and the eccentric circular arc groove 3.1 on the end face of the sliding piece 3 are of the same shape, and only the center of circle of the eccentric circular arc groove 3.1 is biased clockwise. In the present embodiment, a reserved bias is not large, and positioning 5 can be achieved as long as the sliding piece 3 is radially displaced by 2.5 mm. The barrel 10 is a main member for forming a measuring head, the barrel 10 is a slender pipe, the dial indicator 11 is inserted into an upper pipe orifice, and an indicator rod of the dial indicator 11 is axially displaced under the control of the spring 9 and the measuring rod 8 both disposed in the barrel 10. In the present invention, the provided spring 9 is a pressure spring, and under the action of elasticity, the bottom end of the measuring rod 8 is exposed to a large-end pipe orifice of the barrel 10. During installation, the bottom end of the barrel 10 is inserted into inner holes of the pin seat 6 and the base 5 that are stacked, and axially stops at an upper end face of the sliding piece 3, the exposed end of the measuring rod 8 directly pushes against an upper end face of the gage block 1, and a structure for quantitatively detecting an axial position of the gage block 1 in the inner hole of the workpiece WP by the dial indicator 11 is formed accordingly.

In the present invention, for convenience of smooth insertion of the sliding piece 3 into the outer sinking groove in the inner hole of the workpiece WP, at least three axially-adjustable elastic supports 7 are installed at an outer edge of the base 5, the upright supports 7 are in elastic contact with the opening end face of the workpiece WP, the axial lengths of the supports 7 are pre-adjusted, and without an external force, the supports 7 ensure that the bottom end face of the sliding piece 3 is higher than the bottom end face of the outer sinking groove in the inner hole of the workpiece WP to be measured. In the present embodiment, a height difference therebetween is 0.5 mm. During detection, the elastic force of the supports 7 can be overcome to eliminate a small height difference by slightly exerting a force, thus making it convenient to radially insert the outer convex edge of the sliding piece 3 into the outer sinking groove in the inner hole of the workpiece WP.

Figure 8:
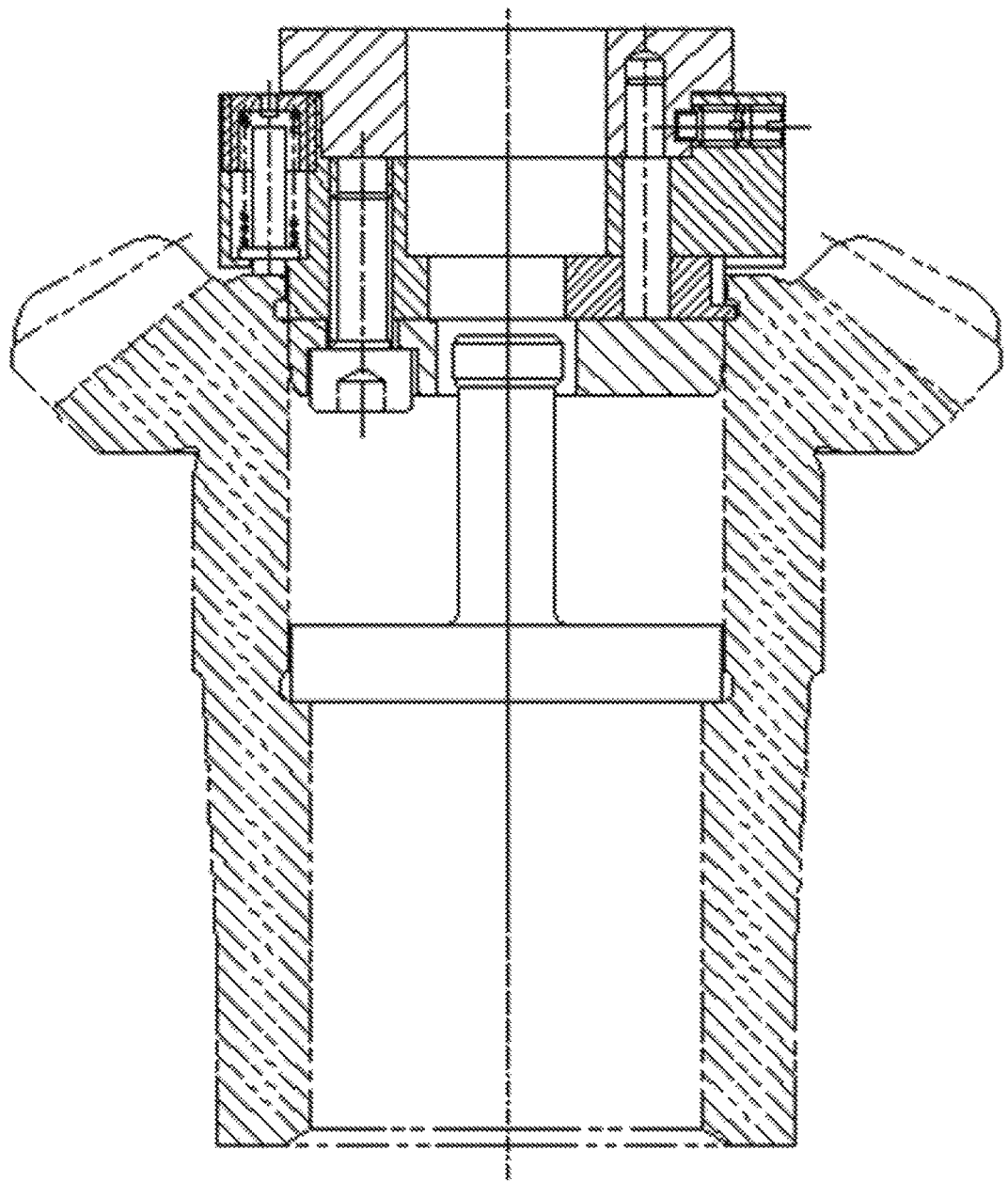
FIG. 8 is a diagram illustrating installation of an assembly shown in FIG. 5 on the basis of FIG. 7.
Figure 9:
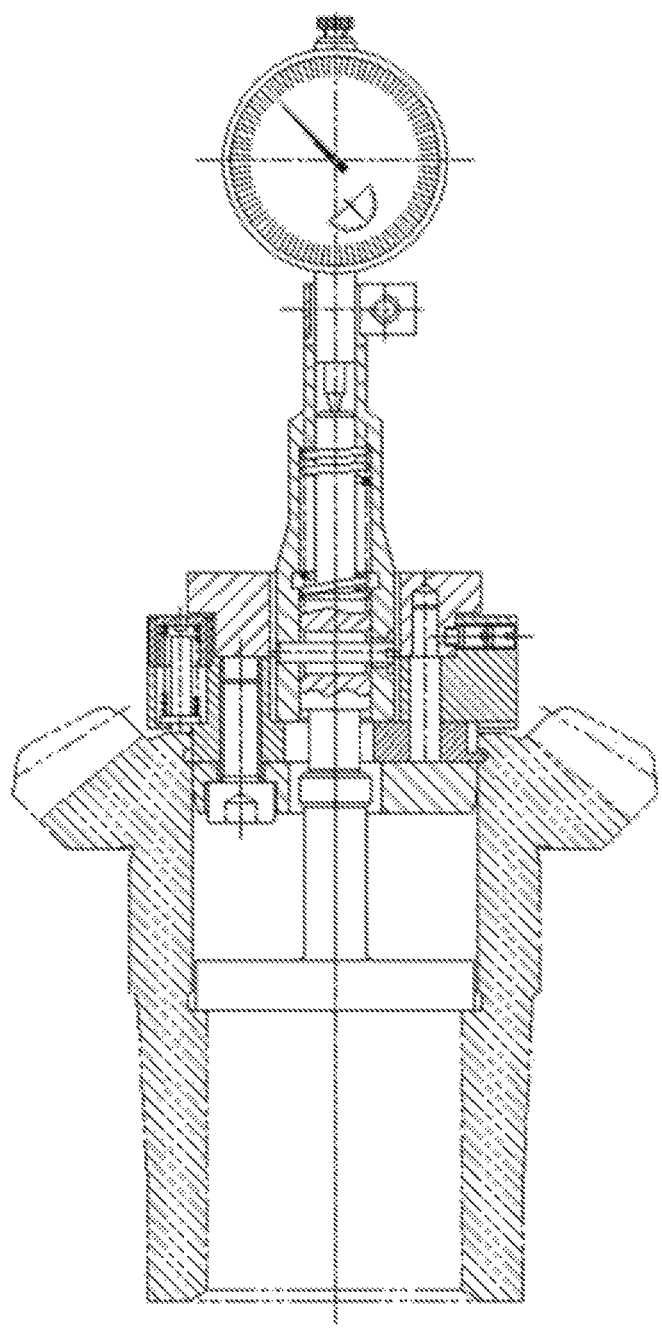
FIG. 9 is a diagram illustrating installation of an assembly shown in FIG. 6 on the basis of FIG. 8.

To achieve fast measurement and accurate measurement, when workpieces in the same batch are measured, it is necessary to zero the dial indicator 11 provided for the measuring head in the present invention, namely, to determine a contact position between the exposed end of the measuring rod 8 and the upper end face of a standard member. Measurement, using the zeroed measuring head, for the distance between the adjacent sinking grooves in the inner hole of the workpiece WP to be measured is as shown in FIG. 9. Before this, the gage block 1 is installed in the inner hole of the workpiece WP to be measured in a sequence as shown in FIG. 7 and FIG. 8, and then the measuring seat is installed at an opening portion of the inner hole of the workpiece WP to be measured. During detection, due to a machining error of the workpiece WP, an indicating value of the dial indicator 11 provided for an indicator 10 head deviates from a set zero, a detector compares a read deviation value with a design value, and quantization is finally performed to judge whether the deviation value and direction of the distance between the adjacent sinking grooves in the inner hole of the workpiece WP are qualified.

In the present invention, during measurement, measurement for the distance between the adjacent sinking grooves in the inner hole is converted into depth measurement by positioning the edges of the adjacent sinking grooves in the inner hole. The checking tool is simple in structure and convenient and fast to operate. The distance between the adjacent sinking grooves in the inner hole of a mechanical part can be accurately measured by using a conventional length measuring tool. The size and direction of a machining deviation are objectively reflected by quantitative detection, thereby facilitating improvement for subsequent machining quality.

What is claimed is:

1. A checking tool for measuring a distance between adjacent sinking grooves in an inner hole of a workpiece, the checking tool comprising:
   a gage block, an end cover, a sliding piece, a pin, a base, a pin seat, a support, a measuring rod, a spring, a barrel, and a dial indicator, the checking tool enabling quantitative detection of an axial position of the gage block in the inner hole of the workpiece by the dial indicator, wherein:
   the gage block (i) has a T-shaped side face, (ii) is disposed on a bottom end face in an inner hole of a workpiece and (iii) stops at an edge of an inner sinking groove, and on this basis, a distance from an outer sinking groove is measured;
   the end cover, the base and the pin seat are all flange-shaped, and an outer circle of the end cover is in clearance fit with an inner hole of a measuring port portion of the workpiece;
   at least three radial opening grooves are uniformly distributed on an end face, facing the inner hole of the workpiece, of the base, each radial opening groove being provided with a sliding piece;
   concentric circular arc grooves paired with the radial opening grooves are also provided on the end face of the base;
   an outer edge of the sliding piece is a circular arc edge, an outer convex edge is shaped for insertion into the outer sinking groove of the workpiece, and a clockwise eccentric circular arc groove corresponding to the concentric circular arc groove on the end face of the base is provided on a plate surface of the sliding piece;
   the pin is a cylindrical pin, a cylinder segment of the pin runs down through the concentric circular arc grooves of the base and the eccentric circular arc groove of the sliding piece axially in sequence, the pin is in interference fit with the pin seat, the sliding piece slides radially and is axially limited by the externally-connected end cover, and the pin seat is driven to rotate relative to the base, such that the pin limits the sliding piece to cause the sliding piece to undergo radial displacement along a track of the eccentric circular arc groove;
   the barrel is a slender pipe, the dial indicator is inserted into an upper pipe orifice, an indicator rod of the dial indicator is axially displaced under the control of the spring and the measuring rod both disposed in the barrel, a bottom end of the barrel is inserted into inner holes of the pin seat and the base, and axially stops at an upper end face of the sliding piece, and the measuring rod disposed in the barrel directly pushes against an upper end face of the gage block under the pushing of the spring.

2. The checking tool for measuring a distance between adjacent sinking grooves in an inner hole of a workpiece according to claim 1, wherein the height of the gage block is smaller than a distance between two adjacent sinking grooves in an inner hole of the workpiece to be measured by 1-2 mm.

3. The checking tool for measuring a distance between adjacent sinking grooves in an inner hole of a workpiece according to claim 1, wherein at least three axially-adjustable elastic supports are installed at an outer edge of the base, the supports are in elastic contact with the opening end face of the workpiece, and the supports are adjusted to make the bottom end face of the sliding piece higher than the bottom end face of the outer sinking groove in the inner hole of the workpiece to be measured by 0.5-1.0 mm under the condition of dead weight.

4. The checking tool for measuring a distance between adjacent sinking grooves in an inner hole of a workpiece according to claim 1, wherein the spring is a pressure spring.

5. The checking tool for measuring a distance between adjacent sinking grooves in an inner hole of a workpiece according to claim 1, wherein the concentric circular arc grooves on the end face of the base and the eccentric circular arc groove on the end face of the sliding piece are of the same shape, only the center of circle of the eccentric circular arc groove is biased clockwise, and the radial displacement of the sliding piece is 2-5 mm.

* * * * *